United States Patent [19]

Rotzoll et al.

[11] 4,354,020

[45] Oct. 12, 1982

[54] CONTINUOUS PREPARATION OF POLYCAPROLACTAM IN VERTICAL TUBULAR REACTOR

[75] Inventors: Rudi-Heinz Rotzoll, Limburgerhof; Paul Matthies, Heidelberg; Guenter Valentin; Werner Hoerauf, both of Ludwigshafen, all of Fed. Rep. of Germany

[73] Assignee: BASF Aktiengesellschaft, Fed. Rep. of Germany

[21] Appl. No.: 143,591

[22] Filed: Apr. 24, 1980

[30] Foreign Application Priority Data

May 10, 1979 [DE] Fed. Rep. of Germany ....... 2918828

[51] Int. Cl.³ .......................................... C08G 69/16
[52] U.S. Cl. ..................................... 528/323; 526/65
[58] Field of Search ........................ 528/323; 526/65

[56] References Cited

U.S. PATENT DOCUMENTS

| | | | |
|---|---|---|---|
| 2,562,796 | 7/1951 | Koch | 528/323 |
| 3,451,976 | 6/1969 | Lucas | 528/323 |
| 3,565,866 | 2/1971 | Guenther | 528/323 |
| 3,813,366 | 5/1974 | Wright et al. | 528/323 |
| 4,204,049 | 5/1980 | Matthies et al. | 528/323 |

*Primary Examiner*—Harold D. Anderson
*Attorney, Agent, or Firm*—Keil & Witherspoon

[57] ABSTRACT

A process for the continuous preparation of polycaprolactam, which comprises polymerizing ε-caprolactam in a vertical tubular reactor through which the ε-caprolactam flows downward, wherein the ε-caprolactam is partially polymerized, at a nylon-forming temperature, in a mechanically mixed zone, the reaction mixture is circulated through a heat exchange zone in the lower part of the mechanically mixed reaction zone, and is polymerized further, in additional heat exchange zones, until the desired degree of polymerization is reached, and poly-ε-caprolactam is then discharged as a melt, and an apparatus for carrying out the process.

1 Claim, 1 Drawing Figure

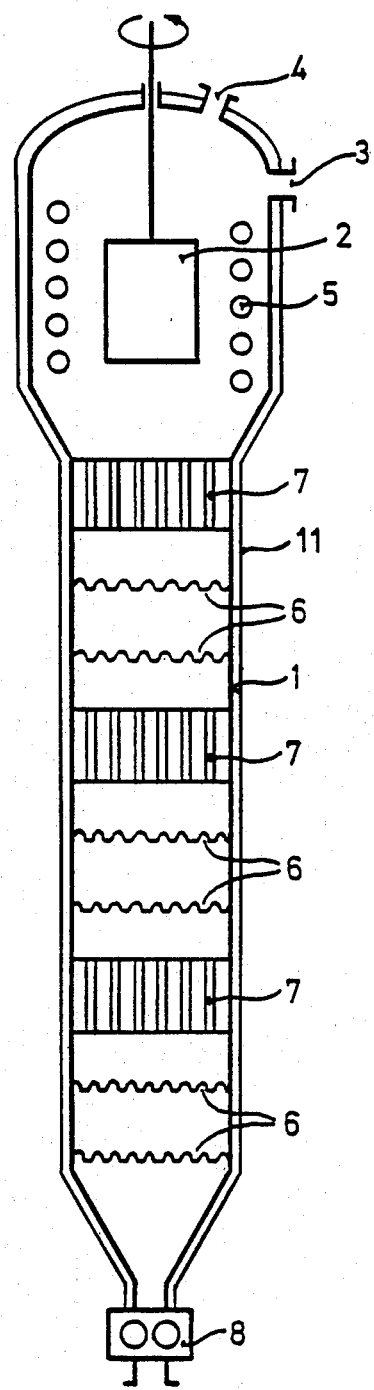

CONTINUOUS PREPARATION OF POLYCAPROLACTAM IN VERTICAL TUBULAR REACTOR

The present invention relates to a continuous process for the preparation of polycaprolactam by polymerizing ε-caprolactam in a vertical tubular reactor through which the ε-caprolactam flows downward, wherein the ε-caprolactam is partially polymerized, at a nylon-forming temperature, in a mechanically mixed reaction zone and is polymerized further, in additional reaction zones with reversible heat exchange, until the desired degree of polymerization is reached, after which polycaprolactam is discharged as a melt, and to an apparatus for carrying out the process.

Industrially, polycaprolactam is prepared by polymerizing caprolactam at from 240° to 300° C. in polymerization tubes, referred to as precondensation tubes, which may or may not be subdivided into zones. Considerable endeavors have already been made to improve and modify the polymerization process. German Published Application DAS No. 1,495,198 discloses a process in which the lactam melt is passed into a polymerization tube of which the top quarter has a larger diameter than the remaining parts of the polymerization tube, the lactam melt is substantially polymerized in the top quarter, whilst stirring, and the polylactam melt is then cooled by means of the reversible heat exchangers located in the remaining part of the tube, in such way that the temperature in the last quarter of the cylindrical tube is only slightly above the solidification point of the polylactam. It is true that this process overcomes the difficulties which arise when admixing additives at the top of the precondensation tube, but the publication does not disclose how the caprolactam melt is rapidly brought to the desired reaction temperature. It also gives no indication as to how the residence time can be reduced, for a given temperature of the heating medium. An apparatus, with stirrer and heat exchanger, for polymerizing caprolactam has also been disclosed in East German Pat. No. 120,455. However, this arrangement does not provide any circulation of the reaction mixture in the heat exchanger, ie. any downward or upward flow.

It is an object of the present invention to conduct the polymerization reaction of caprolactam in a vertical reaction tube in such a way that the caprolactam melt introduced is rapidly brought to the reaction temperature, and that shorter residence times are achieved.

We have found that this object is achieved by a process for the continuous preparation of polycaprolactam by polymerizing ε-caprolactam in a vertical tubular reactor, in which the ε-caprolactam flows downward, wherein the ε-caprolactam is partially polymerized, at a nylon-forming temperature, in a mechanically mixed reaction zone and is then polymerized further in additional heat exchange zones until the desired degree of polymerization is reached, after which poly-ε-caprolactam is discharged as a melt, the reaction mixture being circulated through a heat exchange zone in the lower part of the mechanically mixed reaction zone.

The invention additionally relates to an apparatus for carrying out the process for the continuous preparation of polycaprolactam, comprising a vertical tube with an external heating jacket, orifices for introducing caprolactam melt and for discharging vapors in the upper end, and devices for discharging polycaprolactam at the lower end, the upper 14%-21% of the tube having a diameter which is 30-80% larger than that of the rest of the tube and the wider part of the tube being provided with a stirrer and a heat exchanger, whilst the remaining part of the tube possesses devices for generating a uniform flow profile, together with 2 or more heat exchangers, wherein one heat exchanger is located at the top of the narrow part of the tube and the distance between the lower edge of the stirrer and the upper edge of the heat exchanger corresponds to 0.3-1.5 times the diameter of the narrow part of the tube.

The novel process has the advantage that, regardless of whether the process is carried out under atmospheric pressure or superatmospheric pressure, the caprolactam melt is rapidly brought to the reaction temperature in a simple manner, without great expense, and the overall residence time is reduced. A further advantage is that this is achieved at a constant temperature of the heating medium, thus avoiding the use of several separate circulations for the heating medium.

The polymerization is carried out in a vertical tubular reactor through which the reaction mixture flows downward; this type of tubular reactor has frequently been described, under the name precondensation tube, in the literature. In the first mechanically mixed reaction zone, which accounts for from about 25 to 40% of the volume of the tubular reactor, partial polymerization takes place, with from about 20 to 70% conversion of the caprolactam melt to polymer. The caprolactam is advantageously introduced in the molten state into this first zone, and brought to a nylon-forming temperature by means of heat exchangers, for example heating coils. Advantageously, the upper 14%-21% of the total length of the tubes have a wider diameter, preferably 30-80% wider and especially 30-60% wider, than that of the remaining part of the tube. The further polymerization, to give the desired degree of polymerization, takes place in one or more downstream heat exchange zones. The molten caprolactam is discharged, for example, via screw pumps or gear pumps. The polymer is then taken off as a ribbon or filament and granulated. However, it is also possible to locate a spinning unit directly downstream of the polymerization reactor. It is advantageous if the precondensation tube is heated externally at the same temperature over its entire length.

As a rule, initiators, for example AH salt, aminocaproic acid or, in particular, water are introduced together with the molten caprolactam. Advantageously, water is used as the initiator, in an amount of from 0.2 to 2.0, preferably from 0.3 to 0.7, % by weight based on the caprolactam employed. Excess water is evaporated from the first reaction zone. Larger amounts of water, for example up to 15%, can be employed in special cases, for example as a carrier for introducing additives. Examples of such additives, which are added in a conventional manner, are chain regulators, accelerators, comonomer modifiers, stabilizers, matting agents and other substances to produce special effects.

According to the invention, the reaction mixture (polymerizing caprolactam melt) is circulated through a heat exchange zone in the lower part of the mechanically mixed reaction zone. This means that the mechanically mixed zone extends into the narrow part of the tube. It also means that the temperature of the polymerizing caprolactam melt is virtually identical over the entire mechanically mixed zone. This is achieved if the distance of the heat exchange zone, in the lower part of the mechanically mixed zone, from the stirrer is from 0.3 to 1.5 times the diameter of the narrower part of the tube. This zone is followed by additional heat exchange zones, for example from 1 to 3 further zones.

The polymerization is advantageously carried out at from 240° to 300° C. If the process is carried out under atmospheric pressure, the mechanically mixed reaction zone is advantageously kept at from 245° to 260° C. whilst the downstream zones are as a rule at from 240° to 290° C. If the process is carried out under superatmospheric pressure, for example from 0.2 to 0.9 bar, preferably from 0.25 to 0.7 bar, the mechanically mixed zone is preferably kept at from 260° to 295° C. The downstream zones are then advantageously at from 240° to 300° C. The numerical values of the pressure relate to the vapor space above the first reaction zone. In the melt, the pressure at any point is increased by the hydrostatic pressure of the liquid column above this point. The melt is let down to atmospheric pressure when it is discharged from the reaction tube.

The vapor space above the first reaction zone is filled with caprolactam vapor, water vapor and any inert gas, for example nitrogen, which may be used as a flushing gas. The desired superatmospheric pressure can be generated by appropriately increasing the temperature of the first reaction zone and shutting off the vapor space from the atmosphere. If a flushing gas is used, it is also possible first to generate the desired pressure by forcing in the appropriate amount of flushing gas, and only then to bring the temperature to the desired value. To maintain the desired superatmospheric pressure it is possible, for example, to use a hydrostatic head, the vapor space above the melt in the first reaction zone being sealed off from the atmosphere.

A suitable apparatus for carrying out the process is illustrated in the FIGURE. In this:

1: is a polymerization tube having an enlarged diameter in the upper part,
2: is a stirrer and stirrer shaft,
3: is the feed orifice for molten caprolactam and additives, if any,
4: is an orifice for discharging vapors,
5: are heat exchangers in the wider part of the polymerization tube,
6: are means for producing a uniform flow profile,
7: are heat exchangers in the narrower part of the polymerization tube 1,
8: is a device for discharging the polycaprolactam and
11: is a heating jacket.

The polymerization tube 1, with heating jacket 11, is advantageously cylindrical and its diameter in the upper part is 30–80%, advantageously 30–60%, larger than in the remainder of the tube. The wider part of the tube advantageously accounts for 14%–21% of the total length of the reaction tube. The upper, wider part possesses a feed orifice 3 for the caprolactam melt, together with which additives, eg. matting agents, stabilizers, catalysts or liquors resulting from the extraction of polycaprolactam may also be introduced. Vapors formed during the polymerization, for example water vapor, are discharged through the orifice 4. The stirrer 2 mixes the polymerizing melt and at the same time circulates it through the next heat exchanger (7), below the stirrer. Advantageously, a blade stirrer is used, and the heat exchanger 5 is in the form of pipe coils fed with a heat transfer medium, for example a mixture of diphenyl and diphenyl oxide, or a heat transfer oil. The narrower part of the polymerization tube 1 possesses means 6 for generating a uniform flow profile. Such means are described, for example, in German Pat. No. 1,136,310. In addition, the narrower part of the tube has at least 2, advantageously from 2 to 4, heat exchangers 7 which, like the heat exchanger 5, are fed with suitable heat transfer media. Examples of suitable heat exchangers are tubular heat exchangers, in which case the tubes are advantageously arranged parallel to the axis of the polymerization tube.

According to the invention, a heat exchanger 7 is located at the top of the narrower part of the tube, the distance between the lower edge of the stirrer and the upper edge of the heat exchanger being from 0.3 to 1.5 times the diameter of the narrow part of the tube. If the heat exchangers 7 are tubular heat exchangers, it has proved advantageous if the tube length of the heat exchangers 7 is from 0.02 to 0.08 times the total length of the reaction tube. At the lower end of the tube 1 is a device for discharging the polycaprolactam melt, for example a gear pump or screw pump.

Advantageously, the apparatus additionally comprises means for maintaining the level of the polymerizing mixture in the tube 1, by means of which the flow of molten caprolactam and of additives through the orifice 3 is regulated. In addition, the apparatus advantageously comprises means for temperature measurement, distributed over the length of the polymerization tube 1.

Polycaprolactam is used to manufacture shaped articles by injection molding, extrusion or spinning.

The Examples which follow illustrate the process according to the invention.

EXAMPLE 1

A precondensation tube having a larger diameter in the upper part than in the remainder of the tube is used. The total length of the tube is 16 m. The upper, wider part is 2.5 m high and has a diameter of 1.6 m; the narrower part has a diameter of 1.2 m. The precondensation tube is provided with a heating jacket, in which the heating medium is a vapor mixture of diphenyl and diphenyl oxide. The upper, wider part of the precondensation tube is fitted with a stirrer revolving at 60 rpm, and with heating coils which are heated with diphenyl/diphenyl oxide vapor. In the narrower part of the precondensation tube are two tube-bundle heat exchangers, 0.6 m long, which are also heated with diphenyl/diphenyl oxide vapor. The upper edge of the upper heat exchanger is 0.8 m from the lower edge of the stirrer; this distance corresponds to 0.7 times the tube diameter. The precondensation tube is fed with a mixture of 800 kg of caprolactam and 4 kg of water per hour. The temperature of the heating medium is 275° C. The polymerizing reaction mixture circulates through the upper heat exchanger under the action of the flow pattern generated by the stirrer, and takes up 140,000 kJ of heat per hour from this heat exchanger. In the mechanically mixed reaction zone, the temperature assumes a value of 257° C. both above and below the upper heat exchanger. In the subsequent reaction zones, down to where the polymer melt is discharged from the precondensation tube, the temperature is from 250° to 275° C. With a mean residence time of 20 hours in the tube, the polycaprolactam obtained has a relative viscosity of 3.0.

COMPARATIVE EXAMPLE 1

In contrast to Example 1, the upper edge of the heat exchanger (which is heated with diphenyl/diphenyl oxide vapor) is 3.1 m from the lower edge of the stirrer. This distance corresponds to 2.6 times the tube diameter. As in Example 1, the precondensation tube is fed with a mixture of 800 kg of caprolactam and 4 kg of water per hour. At the same temperature of the heating medium as in Example 1, namely 275° C., the temperature in the mechanically mixed reaction zone assumes a value of only 250° C. The polymerizing reaction mixture then flows downward through the said heat exchanger and in doing so takes up only 29,000 kJ of heat per hour. The polycaprolactam obtained has a relative viscosity of only 2.76.

EXAMPLE 2

The procedure described in Example 1 is followed, except that 1,000 kg of caprolactam and 5 kg of water are fed in per hour. With a residence time of 16 hours, a polycaprolactam having a relative viscosity of 2.88 is obtained.

COMPARATIVE EXAMPLE 2

The procedure described in Comparative Example 1 is followed, except that 1,000 kg of caprolactam and 5 kg of water are fed in. With a residence time of 16 hours, a polycaprolactam having a relative viscosity of 2.71 is obtained.

We claim:

1. A process for the continuous preparation of polycaprolactam which comprises: passing $\epsilon$-caprolactam and an initiating amount of water downwardly through a vertical tubular reactor, wherein the $\epsilon$-caprolactam is partially polymerized with mechanical mixing at a temperature of from 245° to 260° C. in an upper mixing zone of the tubular reactor, said mixing zone being equipped with a mechanical stirrer and having a diameter which is 30 to 80% greater than that of the balance of the tubular reactor, circulating the partially polymerized caprolactam in melt form through a heat exchange zone located at a distance below the stirrer which is 0.3 to 1.5 times the diameter of said balance of the tubular reactor, in a lower part of the mixing zone, passing the melt through at least one additional heat exchange zone at a temperature of from 240° to 290° C., wherein the desired degree of polymerization is reached, and thereafter discharging poly-$\epsilon$-caprolactam as a melt from the reactor tube.

* * * * *